Patented Aug. 5, 1924.

1,504,175

UNITED STATES PATENT OFFICE.

LYNDON D. WOOD, OF BALA, PENNSYLVANIA, ASSIGNOR TO FOTOTONE CO., INC., OF ROCHESTER, NEW YORK, A CORPORATION OF NEW YORK.

COATING COMPOSITION.

No Drawing. Application filed September 22, 1922, Serial No. 589,951. Renewed May 1, 1924.

*To all whom it may concern:*

Be it known that I, LYNDON D. WOOD, a citizen of the United States, residing at Bala, in the county of Montgomery and State of Pennsylvania, have invented new and useful Improvements in Coating Compositions, of which the following is a specification.

This invention relates to a composition for coating wires or other surfaces so as to render the same sensitive to light and also relates to the process of making and using such a composition. By stating that the composition is sensitive to light it is meant that where a sensitive to light cell is constructed having wires or other conductors, these will be bridged by the coating composition about to be described and the composition when in the dark will act substantially as an insulator but when subjected to the action of light will act as a conductor for permitting the flow of the electric current from one wire or other element to another, as is well understood in the art of sensitive to light cells. The principal object is to produce a coating substance which shall be highly sensitive to the effect of light and which will not deteriorate when exposed to light continuously.

The purposes to which such a substance may be put are varied as for instance, in the manufacture of sensitive to light cells such as described in my co-pending application, Serial No. 568,566, also for use in the measuring of light intensities, in the manufacture of fire alarms, and in various other ways which will readily suggest themselves to those skilled in the art to which this application belongs.

My composition comprises substantially:—

|  | Parts. |
|---|---|
| Metallic strontium | 40 |
| Barium | 40 |
| Crude sulphur | 10 |
| Tungstate of soda | 10 |

The above ingredients are heated until they form a liquid, and this liquid is cooled for immersion or plunging in a cold water bath. The substance thus produced is heated when it is to be applied to any surface which it is desired to coat. In the making of sensitive to light cells the wires have the upper insulation scraped from them and the coating composition is placed thereon.

Preferably in use, the surface which is coated will be enclosed in a vacuum bulb such as is shown in my pending application, Serial No. 585,307, as the cell will prove much more sensitive and will have a longer life if so made.

While I have described what I deem to be the most desirable embodiment of my invention, I do not limit myself to the specific details of construction of material, nor to anything less than the whole of my invention as defined in the appended claims.

What I claim:—

1. A composition for coating surfaces for the purpose of permitting electric currents to operate by the action of light comprising a mixture of metallic strontium, barium, sulphur and tungstate of soda.

2. A sensitive to light compound comprising 40 parts of metallic strontium, 40 parts of barium, 10 parts of crude sulphur, and 10 parts of tungstate of soda.

In testimony whereof I affix my signature.

LYNDON D. WOOD.